United States Patent Office 3,478,087
Patented Nov. 11, 1969

3,478,087
HALOALKYL ESTERS OF BENZOPHENONE
TETRACARBOXYLIC ACID
Joseph J. McGrath, Monroeville, and Chester S. Tempalski, McKees Rocks, Pa., assignors to Gulf Research & Development Company, Pittsburgh, Pa., a corporation of Delaware
No Drawing. Filed June 2, 1966, Ser. No. 554,689
Int. Cl. C07c 69/78
U.S. Cl. 260—475
5 Claims

ABSTRACT OF THE DISCLOSURE

Haloalkyl esters of benzophenone 3,4,3',4'-tetracarboxylic acid, particularly the tetra($C_3$ to $C_7$ fluoroalkyl) esters of benzophenone tetracarboxylic acid are liquid at normal atmospheric conditions and are useful lubricants at temperatures of 500° to 600° F. The tetra($C_9$ to $C_{13}$ fluoroalkyl) esters of benzophenone tetracarboxylic acid are solid at normal atmospheric conditions and are useful additives to lubricating oils and motor fuels.

This invention relates to new compounds and more particularly to haloalkyl esters of benzophenone 3,4,3',4'-tetracarboxylic acid. The haloalkyl esters of this invention can be employed as intermediates in the preparation of plasticizers, plastics and fibers. Additionally, the esters can be employed as additives to lubricating oils and motor fuels. The esters which are liquid under normal atmospheric conditions as, for example, the tetra($C_3$ to $C_7$ fluoroalkyl) esters of benzophenone tetracarboxylic acid can be used as lubricants, the $C_5$, $C_7$ and mixed $C_3$–$C_5$ fluoroalkyl esters being especially useful as lubricants at temperatures up to about 500° to 600° F. for extended periods of time.

The haloalkyl esters of benzophenone 3,4,3',4'-tetracarboxylic acid of this invention can be represented by the following general structural formula:

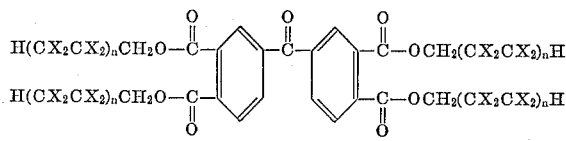

wherein X is selected from the group consisting of chlorine and fluorine and $n$ is an integer of 1 to 6. The haloalkyl esters of benzophenone 3,4,3',4'-tetracarboxylic acid range from liquids to solids. Thus, for example, where $n$ in the above formula is 1 to 3, the products under normal atmospheric conditions are liquid; where $n$ is 4 to 6, the products are solid.

The haloalkyl esters of benzophenone 3,4,3',4'-tetracarboxylic acid are prepared by reacting benzophenone 3,4,3',4'-tetracarboxylic dianhydride with a trihydroperhaloalkyl alcohol having the general formula

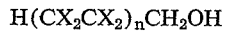

wherein X is a halogen selected from the group consisting of chlorine and fluorine and $n$ is an integer of 1 to 6. We can use individual alcohols or mixtures thereof, excellent high temperature lubricating fluids having been obtained by reacting benzophenone 3,4,3',4'-tetracarboxylic dianhydride with 1,1,5-trihydrooctafluoro-1-pentanol and with a mixture of 1,1,3-trihydrotetrafluoro-1-propanol and 1,1,5-trihydrooctafluoro-1-pentanol.

In preparing the compounds of this invention, the benzophenone tetracarboxylic dianhydride and the haloalkyl alcohol are reacted together in amounts such that the alcohol is present in an amount which is at least equal to the amount stoichiometrically required to react completely with the benzophenone tetracarboxylic dianhydride. Thus, the mol ratio of alcohol to benzophenone tetracarboxylic dianhydride is at least about 4:1. The reaction is preferably conducted in the presence of a polar solvent such as methanol and ether or a non-polar solvent such as benzene, toluene, xylene, chloroform and carbon tetrachloride. Fluoro alcohols are more soluble in polar solvents than they are in non-polar solvents. The reaction is accelerated by the use of an esterification catalyst such as sulfuric acid, hydrochloric acid, toluene sulfonic acid and phosphoric acid. The reaction is carried out under reflux conditions which may be at a temperature within the range of about 35° to about 150° C. depending upon the pressure and the particular solvent which is used. The reaction can be conducted at autogenous pressure for a period of about ½ to 24 hours or more. The reaction is preferably conducted under a blanket of nitrogen. Upon completion of the reaction, the reaction mass is neutralized as with sodium hydrogen carbonate after which the product is recovered by removal of the solvent as by vacuum distillation. When the product is a solid, purification is effected by repeated recrystallizations from a solvent, e.g., acetone or benzene.

The reactants employed in preparing the haloalkyl esters of benzophenone tetracarboxylic acid are available commercially. Therefore, neither reactant nor its method of preparation per se constitutes any part of this invention. Benzophenone 3,4,3',4',-tetracarboxylic dianhydride, for example, can be prepared according to the method described in U.S. Patent No. 3,078,279 which issued on Feb. 19, 1963 to J. H. McCracken et al. Briefly, in the process of the patent, di-ortho-xylylethane is subjected to oxidation with 30 percent nitric acid in a closed reactor. The weight ratio of 30 percent nitric acid to di-ortho-xylylethane is about 12 to 1. The temperature of the reaction mass is raised gradually to about 200° C. for a period of three hours and thereafter held at about 200° to 210° C. for an additional hour. Gases are vented intermittently to allow a gradual increase in pressure to about 265 pounds per square inch gauge. The reaction mass is then cooled to about 25° C. and allowed to stand in an open vessel for precipitation of the dianhydride. The dianhydride is thereafter recovered by filtration.

The trihydroperhaloalkyl alcohols which are employed in preparing the haloalkyl esters of benzophenone tetracarboxylic acid can be prepared by the free radical telomerization of a tetrahaloethylene with methanol as illustrated by the following equation wherein $n$ and X are as defined hereinabove:

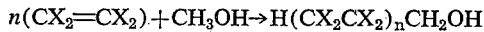

Included within the tetrahaloethylenes represented by ($CX_2$=$CX_2$) are tetrafluoroethylene, tetrachloroethylene, chlorotrifluoroethylene, fluorotrichloroethylene, 1,1-dichloro-2,2-difluoroethylene and 1,2-dichloro-1,2-difluoroethylene.

The telomerization of tetrafluoroethylene with methanol in the presence of a free radical initiator is described in an article entitled "Fluoro Alcohols" by D. R. Baer, Industrial and Engineering Chemistry, volume 51, pages 829–830 (1959). As disclosed therein, the reaction is governed by the general principles of chain transfer. High yields of the lower fluoro alcohols ($n=1$ to 6) are obtained by reacting tetrafluoroethylene with an excess of methanol in the presence of a peroxide initiator such as di-tertiary-butyl peroxide. Sufficient methanol is employed to maintain the reaction mass fluid and also to aid in dissipating the heat evolved in the highly exothermic reaction. Temperatures of from 80° to 200° C. and tetrafluoroethylene pressures from 15 to 3000 pounds are used. For maximum safety, the reaction is conducted in an electrically heated, high pressure, stainless steel autoclave equipped with a stirrer, an internal cooling coil and a rupture disk. The $C_3$ through $C_{13}$ fluoro alcohols ($n=1$ to 6) are separated from the reaction mass by fractional distillation. The lower molecular weight $C_3$ through $C_7$ fluoro alcohols ($n=1$ to 3) are colorless liquids with low melting points, whereas the $C_9$ through $C_{13}$ fluoro alcohols ($n=4$ to 6) are white crystalline solids. The $C_3$ fluoro alcohol crystallizes readily at −15° C.; the $C_5$ fluoro alcohol does not crystallize on standing at −65° C.; the $C_7$ fluoro alcohol melts at −14° C. The $C_9$, $C_{11}$ and $C_{13}$ fluoro alcohols melt at 69°, 102° and 132° C., respectively, under a pressure of 200 mm. of mercury.

The synthesis of the haloalkyl esters of benzophenone 3,4,3',4'-tetracarboxylic acid of the invention will be demonstrated by the following specific examples.

EXAMPLE I

Into a 1000 ml. 3-necked flask fitted with a mechanical stirrer, a reflux condenser and a drying tube were placed 32.2 grams (0.1 mol) of benzophenone 3,4,3',4'-tetracarboxylic dianhydride and 92.8 grams (0.4 mol) of 1H,1H,5H-octafluoro-1-pentanol. The mixture was stirred 15 minutes at room temperature. Thereafter, 4 ml. of concentrated sulfuric acid dispersed in 100 ml. of benzene was added to the mixture. The mixture was then heated to its reflux temperature (180° F.) where it was held under a nitrogen cloud for 24 hours. The reaction mass was then neutralized with an aqueous sodium hydrogen carbonate solution and washed to neutrality with distilled water. The solvent was then stripped from the product giving a light amber colored fluid having a boiling point greater than 550° F. The product is a tetra($C_5$-fluoroalkyl) ester of benzophenone 3,4,3',4'-tetracarboxylic acid having the following structural formula:

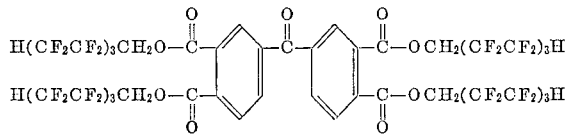

EXAMPLE II

Into a 500 ml. 3-necked flask containing a magnetic stir bar and fitted with a reflux condenser and drying tube, nitrogen supply and thermometer were placed 8.05 grams (0.025 mol) of benzophenone-3,4,3',4'-tetracarboxylic dianhydride and 13.2 grams (0.1 mol) 1H,1H,3H-tetrafluoro-1-propanol. The mixture was stirred under a nitrogen cloud for 15 minutes at room temperature. Thereafter 1.8 ml. of concentrated sulfuric acid dispersed in 200 ml. of benzene was added to the mixture. The mass was then heated to its reflux temperature (180° F.) where it was held under a nitrogen cloud for 24 hours and cooled. The reaction mixture was neutralized with aqueous sodium hydrogen carbonate and extracted with chloroform. The chloroform extract was washed with distilled water and dried over anhydrous sodium sulfate. The solvent was stripped from the product under vacuum giving a light amber colored fluid having a boiling point greater than 500° F. The product is a tetra($C_3$-fluoroalkyl)ester of benzophenone-3,4,3',4'-tetracarboxylic acid having the following structural formula:

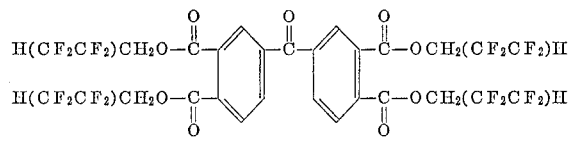

EXAMPLE III

Into a 500 ml. 3-necked flask containing a magnetic stir bar and fitted with a reflux condenser and drying tube, nitrogen supply and thermometer were placed 24.2 grams (0.075 mol) benzophenone-3,4,3',4'-tetracarboxylic dianhydride and 99.6 (0.3 mol) 1H,1H,7H-dodecafluoro-1-heptanol. The mixture was stirred under a nitrogen cloud for 15 minutes at room temperature. Thereafter 8 ml. concentrated sulfuric acid dispersed in 300 ml. of benzene was added to the mixture. The mass was then heated to its reflux temperature (180° F.) where it was held under a nitrogen cloud for 24 hours and cooled. The mass was neutralized with aqueous sodium hydrogen carbonate and extracted with chloroform. The chloroform extract was washed with distilled water and dried over anhydrous sodium sulfate. The solvent was then stripped from the product to give a light amber colored fluid having a boiling point greater than 550° F. The product is a tetra($C_7$-fluoroalkyl)ester of benzophenone-3,4,3',4'-tetracarboxylic acid having the following structural formula:

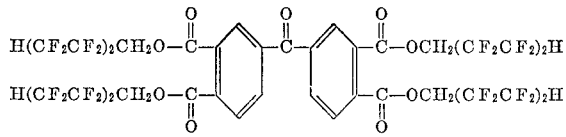

EXAMPLE IV

Into a 500 ml. 3-necked flask containing a magnetic stir bar and fitted with a reflux condenser and drying tube, nitrogen supply and thermometer, were placed 32.2 grams (0.1 mol) benzophenone-3,4,3',4'-tetracarboxylic dianhydride, 26.2 grams (0.2 mol) 1H,1H,3H-tetrafluoro-1-propanol and 46.4 grams (0.2 mol) 1H,1H,5H-octafluoro-1-pentanol. The mixture was stirred under a nitrogen cloud for 15 minutes at room temperature. Thereafter 8 ml. of concentrated sulfuric acid dispersed in 200 ml. of benzene was added to the mixture. The mass was then heated to its reflux temperature (180° F.) where it was held under a nitrogen cloud for 24 hours. The mixture was cooled and neutralized with aqueous sodium hydrogen carbonate and extracted with chloroform. The chloroform extract was washed with distilled water and dried over anhydrous sodium sulfate. The solvent was stripped from the product giving a light amber colored fluid having a boiling point greater than 500° F. The product is the mixed tetra($C_3$–$C_5$-fluoroalkyl) ester of benzophenone-3,4,3',4'-tetracarboxylic acid having the following structural formula:

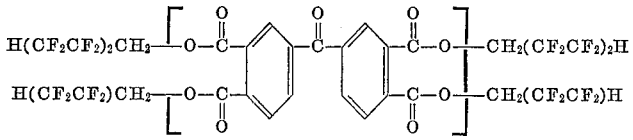

EXAMPLE V

Into a 500 ml. 3-necked flask containing a magnetic stir bar and fitted with a reflux condenser and drying tube, nitrogen supply and thermometer were placed 16.1 grams (0.05 mol) benzophenone-3,4,3',4'-tetracarboxylic dianhydride and 106.43 grams (0.2 mol) of a commercial grade of 1H,1H,11H - eicosafluoro - 1 - undecanol. The eicosafluoro undecanol was a mixture of primary (85%), secondary (13%) and other (2%) homologous alcohols. The reaction mixture was stirred under a nitrogen cloud for 15 minutes at room temperature. Thereafter, a 4 ml. of concentrated sulfuric acid dispersed in 250 ml. of benzene was added to the mixture. The mass was then heated to its reflux temperature (180° F.) where it was held under a nitrogen cloud for 24 hours. Upon cooling, a precipitate formed. Filtering yielded a creamy-tan precipitate and a dark amber colored filtrate.

Precipitate

This product was neutralized with aqueous sodium hydrogen carbonate and washed to neutrality with distilled water. Washing well with acetone yielded an acetone-insoluble white powdery product (48 grams). The acetone washings yielded a tan powder. The tan powder was dissolved in acetone and poured into cold benzene giving a cream colored product (26 grams). The benzene-acetone filtrate yielded a light-brown hard wax-like product (14.5 grams).

Filtrate

This fluid was neutralized with aqueous sodium hydrogen carbonate and washed to neutrality with distilled water. The solvent was stripped off yielding a yellow cream colored powder. Recrystallization from benzene gave 7.5 grams. All of the products thus obtained are considered to be isomeric tetra($C_{11}$-fluoroalkyl)esters of benzophenone-3,4,3',4'-tetracarboxylic acid.

As indicated herein above, the haloalkyl esters of the invention are useful as chemical intermediates in the preparation of plasticizers, plastics and fibers; as lubricating oil and motor fuel additives; and as lubricants per se, the tetra($C_3$ to $C_7$ fluoroalkyl) esters being especially useful at temperatures up to about 500° to 600° F. in the presence of air over prolonged periods of time. While some mineral oils especially hydrotreated mineral oils are sufficiently stable to provide adequate lubrication when used under moderately elevated temperatures, the volatility of mineral oils is such that they do not give adequate lubrication at temperatures of 500° to 600° F. Synthetic oils such as the polyaryl ethers and the polyorgano siloxanes known commercially as the silicone oils are more resistant to thermal degradation than mineral oils, but even the polyaryl ethers and polyorgano siloxanes have a tendency to volatilize and to solidify when heated at 600° F. in the presence of air over prolonged periods. While volatilization in itself would not necessary negate the use of a material as a lubricating oil, volatilization coupled with solidification cannot be tolerated where a liquid lubricant is required.

The haloalkyl esters, particularly the tetra($C_5$-fluoroalkyl) and mixed tetra($C_3$ and $C_5$ fluoroalkyl)esters of benzophenone 3,4,3',4'-tetracarboxylic acid of the invention have improved volatilization characteristics and more importantly remain liquid even though volatilization occurs when heated at 500° to 600° F. in the presence of air over prolonged periods.

In order to illustrate the improved volatility and non-solidifying characteristics of the fluoroalkyl esters of benzophenone 3,4,3',4'-tetracarboxylic acid of the invention, a hydrotreated mineral oil and various synthetic lubricating oils were compared with $C_5$ and mixed $C_3$–$C_5$ fluoroalkyl esters of the invention. The test used in making the comparisons comprises placing ten grams of the test fluid into 50 ml. beakers cut to a height of 1⅝ inches. The beakers are covered with stainless steel lids containing one %4-inch hole. The beakers are placed in an oven where they are heated at a selected test temperature of 450° to 600° F. in the presence of air. The beakers are withdrawn periodically and weighed to determine the extent of evaporation. The mobility of the fluids at the test temperature and after cooling to 80° F. is also observed.

In the tests summarized in Table I, $C_5$ and mixed $C_3$–$C_5$ fluoroalkyl esters of benzophenone tetracarboxylic acid of the invention are compared with a hydrotreated mineral oil and with various commercially available synthetic oils. The commercially available synthetic oils which were used included polyorgano siloxanes (DC–550 Fluid and QF–6–7024); fluoroalkyl esters ("Commercial Fluoroalkyl Ester A" and "Commercial Fluoroalkyl Ester B") and a polyaryl ether (bis[phenoxyphenoxy]benzene, mixed isomers).

DC–550 Fluid is considered to be a methylphenylsiloxane polymer wherein the "end" silicon atoms are substituted to a high degree by methyl groups. DC–550 Fluid has as typical characteristics a viscosity at 100° F. of 300 to 400 SUS, a viscosity-temperature coefficient of 0.75, a freezing point of −54° F., a flash point of 600° F. and a specific gravity 25° C./25°C. of 1.08. It is believed that the types of side chains present and their approximate molar percentages (in brackets) in DC–550 Fluid are phenyl (35), methyl attached through silicon to methyl (40) and methyl attached through silicon to phenyl (25). An ideal molecule of a polyorgano siloxane having this analysis is as follows:

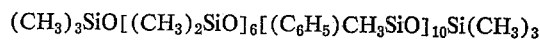

$(CH_3)_3SiO[(CH_3)_2SiO]_6[(C_6H_5)CH_3SiO]_{10}Si(CH_3)_3$

QF–6–7024 is considered to be a methylphenylsiloxane polymer wherein the "end" silicon atoms are substituted to a high degree by two phenyl groups and one methyl group. QF–6–7024 Fluid has as typical characteristics a viscosity at 100° F. of about 930 to 1030 SUS, a viscosity at 210° F. of about 90 to 100 SUS, a viscosity index of about 108 to 110 and a pour point of +10° to +20° F. It is believed that the types of side chains present and their approximately molar percentages (in brackets) in QF–6–7024 Fluid are phenyl (65), methyl attached through silicon to methyl (25) and methyl attached through silicon to phenyl (10). An ideal molecule of a polyorgano siloxane having this analysis is as follows:

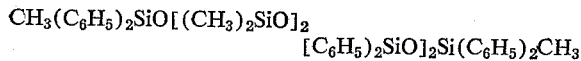

$CH_3(C_6H_5)_2SiO[(CH_3)_2SiO]_2$
$[C_6H_5)_2SiO]_2Si(C_6H_5)_2CH_3$

"Commercial Fluoroalkyl Ester A" is considered to be the condensation product of pyromellitic anhydride and a mixture of $C_5$–$C_7$ trihydrofluoroalcohols. "Commercial Fluoroalkyl Ester A" has as typical characteristics a viscosity at 115° F. of about 399 centistokes, a viscosity at 150° F. of about 128 centistokes, a pour point of −5° F., a flash point >550° F. and a fire point >550° F.

"Commercial Fluoroalkyl Ester B" is considered to be the ester of dl-camphoric acid and $C_7$ trihydrofluoroalcohol. "Commercial Fluoroalkyl Ester B" has as typical characteristics a viscosity at 115° F. of about 73 centistokes, a viscosity at 150 F. of about 28 centistokes, a pour point of −25° F., a flash point of 460° F. and a fire point >550° F.

The polyaryl ether, bis(phenoxyphenoxy)benzene, mixed isomers which was used has a typical charactistics a viscosity at 100° F. of 1961 SUS, a viscosity at 210° F. of 71 SUS and a pour point of +40° F.

TABLE I.—EVALUATION OF HIGH TEMPERATURE FLUIDS

| Fluid | Evaluation Temperature, °F. | Percent by Weight Evaporation, Hours—Condition [2] | | | | | |
|---|---|---|---|---|---|---|---|
| | | 24 | 48 | 64 | 72 | 96 | 120 |
| Tetra(C$_5$-fluoroalkyl)ester of BTA[1] (Example I) | 450 | 0 (a) | | | 0 (a) | | 0 (a). |
| Hydrotreated mineral oil | 450 | 0.7 (a) | | | 2.3 (a) | | 3.3 (a) |
| Tetra(C$_5$-fluoroalkyl)ester of BTA[1] (Example I) | 500 | 1.0 (a) | | | 1.8 (a) | | 2.2 (a). |
| Tetra(C$_3$-C$_5$-fluoroalkyl)ester of BTA[1] (Example IV) | 500 | 2.0 (a) | | | | | 3.4 (a). |
| "Commercial Flouroalkyl Ester A" | 500 | 28 (c,d) | | 72 (c, d) | | | 99 (e). |
| "Commercial Fluoroalkyl Ester B" | 500 | 26 (a) | | 76 (a) | | | 97 (e). |
| Tetra(C$_5$-fluoroalkyl)ester of BTA[1] (Example I) | 600 | 10 (a) | 19.4 (a) | | 30 (a) | 41 (a) | |
| Hydrotreated mineral oil | 600 | 11 (a) | | | 23 (a) | 31 (a) | |
| Bis(phenoxyphenoxy)benzene, mixed isomers | 600 | 3 (a) | | 13 (c, f) | | 16 (c, d) | |
| DC-550 Fluid | 600 | | 18.5 (d, e) | | | | |
| QF-6-7024 | 600 | | 7.7 (a) | | | 28.3 (a) | 33.7 (c, d) |

| Fluid | Evaluation Temperature, °F. | Percent by Weight Evaporation, Hours—Condition [2] | | | | | |
|---|---|---|---|---|---|---|---|
| | | 144 | 168 | 240 | 500 | 1,000 | 2,000 | 2,600 |
| Tetra(C$_5$-fluoroalkyl)ester of BTA[1] (Example I) | 450 | | | 0.5 (a) | 0.9 (a) | | | |
| Hydrotreated mineral oil | 450 | | | 5.8 (a) | (b) | | | |
| Tetra(C$_5$-fluoroalkyl)ester of BTA[1] (Example I) | 500 | | | | 4.9 (a) | 12 (a) | 30 (a) | 39 (a, g). |
| Tetra(C$_3$-C$_5$-fluoroalkyl)ester of BTA[1] (Example IV) | 500 | | | | 7.4 (a) | 20 (a) | 38 (a) | 45 (a, h). |
| "Commercial Fluoroalkyl Ester A" | 500 | | | | | | | |
| "Commercial Fluoroalkyl Ester B" | 500 | | | | | | | |
| Tetra(C$_5$-fluoroalkyl)ester of BTA[1] (Example I) | 600 | | 60 (c, d) | | | | | |
| Hydrotreated mineral oil | 600 | 49 (e) | | | | | | |
| Bis(phenoxyphenoxy)benzene, mixed isomers | 600 | 23 (e) | | | | | | |
| DC-550 Fluid | 600 | | | | | | | |
| QF-6-7024 | 600 | 37.4 (e) | | | | | | |

[1] BTA = benzophenone 3,4,3′,4′-tetracarboxylic acid.
[2] Condition: (a) Fluid at 80° F. (b) Solid in 394 hours; (c) Fluid at evaluation temperature; (d) Solid at 80° F.; (e) Solid at evaluation temperature;
(f) Viscous at 80° F.; (g) Test discontinued after 2,600 hours even though the sample was still fluid at 80° F.;
(h) Test discontinued after 2,500 hours even though the sample was still fluid at 80° F.

The improved characteristics of the C$_5$ and mixed C$_3$–C$_5$ fluoroalkyl esters of benzophenone 3,4,3′,4′-tetracarboxylic acid are evidenced by the data in Table I. With respect to the evaluation at 450° F., it will be noted that the tetra(C$_5$-fluoroalkyl) ester of benzophenone 3,4,3′,4′-tetracarboxylic acid remained in a fluid condition at 80° F. even after being heated at 450° F. for 500 hours and that the amount of evaporation was only 0.9 percent by weight. At the same temperature (450° F.), the hydrotreated mineral oil was solid in 394 hours with an evaporation in excess of 5.8 percent. At the 500° F. evaluation, both fluids of the invention, viz., the C$_5$ and mixed C$_3$–C$_5$ fluoroalkyl esters of benzophenone 3,4,3′, 4′-tetracarboxylic acid remained in a fluid state at 80° F. even after being heated at 500° F. for 2600 and 2500 hours, respectively. In comparison "Commercial Fluoroalkyl Ester A" and "Commercial Fluoroalkyl Ester B" were solid after 120 hours at 500° F. Both of the "Commercial Flouroalkyl Ester A" and "Commercial Flouroalkyl Ester B" fluids were almost completely volatilized in 120 hours. In the evaluation at 600° F., it will be noted that DC-550 fluid was solid at the evaluation temperature after 48 hours. All of the other comparative fluids, viz, the hydrotreated mineral oil, bis(phenoxyphenoxy)benzene and QF-6-7024, were solid at the evaluation temperature after 144 hours. The fluid of the invention, viz, the C$_5$-fluoroalkyl ester of benzophenone 3,4,3′,4′-tetracarboxylic acid remained in a fluid state at the evaluation temperature after 168 hours, notwithstanding the 60 percent evaporation.

While our invention has been described with reference to various specific examples and embodiments it will be understood that the invention is not limited to such examples and embodiments and may be variously practiced within the scope of the claims hereinafter made.

We claim:
1. A haloalkyl ester having the following structural formula:

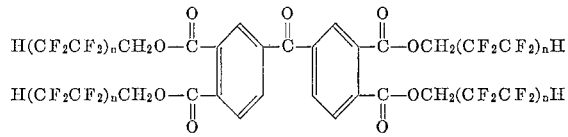

wherein $n$ is in integer of 1 to 3.
2. The haloalkyl ester of claim 1 where $n$ is 1.
3. The haloalkyl ester of claim 1 wherein $n$ is 2.
4. The haloalkyl ester of claim 1 wherein $n$ is 3.
5. A haloalkyl ester of benzophenone tetracarboxylic acid consisting essentially of the product obtained by catalytically esterifying benzophenone 3,4,3′,4′-tetracarboxylic dianhydride with a mixture of 1,1,3-trihydrotetrafluoro-1-propanol and 1,1,5-trihydrooctafluoro-1-pentanol in the presence of a solvent therefor under refluxing conditions, the mol ratio of benzophenone-3,4,3′,4′-tetracarboxylic dianhydride to 1,1,3-trihydrotetrafluoro-1-propanol to 1,1,5-trihydrooctafluoro-1-pentanol being 1 to 2 to 2, respectively.

References Cited

UNITED STATES PATENTS 3,004,061   10/1961   Baer et al. _____ 260—475

JAMES A. PATTEN, Primary Examiner

E. J. SKELLY, Assistant Examiner

U.S. Cl. X.R.

252—54.6

PO-1050
(5/69)

UNITED STATES PATENT OFFICE
CERTIFICATE OF CORRECTION

Patent No. 3,478,087  Dated November 11, 1969

Inventor(s) Joseph J. McGrath and Chester S. Tempalski

It is certified that error appears in the above-identified patent and that said Letters Patent are hereby corrected as shown below:

Column 4, last formula, the left-hand bracket should be completed as follows: -- [ --.

Column 5, line 12, "Thereafter, a 4 ml." should read -- Thereafter, 4 ml. --.

Column 6, line 46, "approximately" should read -- approximate --;

line 73, "has a" should read -- has as --;

line 74, "1961" should read -- 1691 --.

Column 8, Table I, under the heading Percent by Weight Evaporation, Hours-Condition$^2$ and under the number 48 column "19.4(a)" should read -- 19.2(a) --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents